US012757043B2

(12) United States Patent
Deghel et al.

(10) Patent No.: US 12,757,043 B2
(45) Date of Patent: Oct. 6, 2026

(54) SPATIAL ADAPTATION FOR ENERGY SAVING

(71) Applicant: Nokia Technologies Oy, Espoo (FI)

(72) Inventors: Matha Deghel, Massy (FR); Youngsoo Yuk, Seoul (KR)

(73) Assignee: Nokia Technologies, Espoo (FI)

(*) Notice: Subject to any disclaimer, the term of this patent is extended or adjusted under 35 U.S.C. 154(b) by 300 days.

(21) Appl. No.: 18/405,221

(22) Filed: Jan. 5, 2024

(65) Prior Publication Data

US 2024/0284207 A1 Aug. 22, 2024

(30) Foreign Application Priority Data

Feb. 17, 2023 (GB) ..................................... 2302286

(51) Int. Cl.
*H04W 24/08* (2009.01)
*H04W 72/23* (2023.01)

(52) U.S. Cl.
CPC ........... *H04W 24/08* (2013.01); *H04W 72/23* (2023.01)

(58) Field of Classification Search
None
See application file for complete search history.

(56) References Cited

U.S. PATENT DOCUMENTS

2016/0105817 A1 4/2016 Frenne et al.
2021/0218455 A1* 7/2021 Park ......................... H04B 7/08
2021/0337552 A1 10/2021 Taherzadeh Boroujeni et al.
2024/0063872 A1* 2/2024 Hsieh ................... H04B 7/0626
2024/0072978 A1* 2/2024 Abotabl ................ H04L 5/0048
2024/0244467 A1* 7/2024 Jeon ....................... H04W 24/10
2024/0267101 A1* 8/2024 Hu ......................... H04W 52/16
(Continued)

FOREIGN PATENT DOCUMENTS

WO 2021/217328 A1 11/2021
WO 2022/047759 A1 3/2022
(Continued)

OTHER PUBLICATIONS

"3rd Generation Partnership Project; Technical Specification Group Radio Access Network; NR; Physical layer procedures for data (Release 17)", 3GPP TS 38.214, V17.4.0, Dec. 2022, pp. 1-231.
(Continued)

*Primary Examiner* — Khaled M Kassim
*Assistant Examiner* — Shima Wasel
(74) *Attorney, Agent, or Firm* — Lippes Mathias LLP

(57) ABSTRACT

Embodiments of the present disclosure relate to devices, methods, apparatuses and computer readable storage media of spatial adaptation for energy saving. The method comprises: receiving, at a first device from a second device, a change indication indicating at least one antenna port of which at least one antenna element is changed. The antenna port is active before and after the change. The method further comprises performing at least one of a measurement of at least one reference signal or a reception of a physical channel in consideration of the at least one antenna port. In this way, the first device may be informed about impact of spatial adaptation of the second device and is able to adapt the impacted channel state information measurement and/or reporting. As such, energy saving can be achieved.

18 Claims, 6 Drawing Sheets

(56) References Cited

U.S. PATENT DOCUMENTS

| | | | | |
|---|---|---|---|---|
| 2025/0192846 | A1* | 6/2025 | Kim | H04W 24/10 |
| 2025/0240726 | A1* | 7/2025 | Cheng | H04W 52/028 |
| 2025/0374107 | A1* | 12/2025 | George | H04L 5/0053 |

FOREIGN PATENT DOCUMENTS

| | | | | |
|---|---|---|---|---|
| WO | 2022/077414 | A1 | 4/2022 | |
| WO | 2022/077427 | A1 | 4/2022 | |
| WO | WO-2023245546 | A1 * | 12/2023 | H04L 5/0094 |
| WO | WO-2024168706 | A1 * | 8/2024 | H04L 5/0094 |

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; NR; Physical layer procedures for control (Release 17)", 3GPP TS 38.213, V17.4.0, Dec. 2022, pp. 1-258.

"Network energy saving techniques", 3GPP TSG RAN WG1 #111, R1-2212057, Agenda: 9.7.2, Samsung, Nov. 14-18, 2022, 22 pages.

"IEEE 802.11", Wikipedia, Retrieved on Jan. 4, 2024, Webpage available at : https://en.wikipedia.org/wiki/IEEE_802.11.

Search Report received for corresponding United Kingdom Patent Application No. 2302286.6, dated Aug. 24, 2023, 3 pages.

"Discussion on NW energy saving techniques", 3GPP TSG RAN WG1 meeting #111, R1-2211904, Agenda: 9.7.2, ZTE, Nov. 14-18, 2022, 20 pages.

"Discussion on network energy saving techniques", 3GPP TSG-RAN WG1 Meeting #110bis-e, R1-2208425, Agenda: 9.7.2, Huawei, Oct. 10-19, 2022, 14 pages.

"Discussion Summary #2 for energy saving techniques of NW energy saving SI", 3GPP TSG RAN WG1 Meeting #111, R1-2212565, Agenda: 9.7.2, Intel Corporation, Nov. 14-18, 2022, 133 pages.

Extended European Search Report received for corresponding European Patent Application No. 24150282.2, dated Jul. 15, 2024, 7 pages.

"Discussions on network energy saving techniques", 3GPP TSG RAN WG1 #111, R1-2211019, Agenda: 9.7.2, vivo, Nov. 14-18, 2022, 40 pages.

* cited by examiner

SPATIAL ADAPTATION FOR ENERGY SAVING

FIELDS

Various example embodiments of the present disclosure generally relate to the field of telecommunication and in particular, to methods, devices, apparatuses and computer readable storage medium for spatial adaptation.

BACKGROUND

Energy consumption and energy saving in 5th Generation Mobile Communication Technology (5G) new radio (NR) has been studied in the past few years. Quite large part of the total energy consumption in the 5G network comes from the Radio Access Network (RAN) and in particular from the Active Antenna Unit (AAU). As one of the key points for the topic of energy consumption, the network energy saving (ES) in time, frequency, spatial/antenna, and power domain has been discussed. Works are ongoing regarding spatial adaptation for energy saving.

SUMMARY

In a first aspect of the present disclosure, there is provided a first device. The first device comprises at least one processor; and at least one memory storing instructions that, when executed by the at least one processor, cause the first device at least to perform: receiving, from a second device, a change indication indicating at least one antenna port of which at least one antenna element is changed, the antenna port being active before and after the change; and performing at least one of a measurement of at least one reference signal or a reception of a physical channel in consideration of the at least one antenna port.

In a second aspect of the present disclosure, there is provided a second device. The second device comprises at least one processor; and at least one memory storing instructions that, when executed by the at least one processor, cause the second device at least to perform: determining whether at least one antenna element of the second device is changed or not, the at least one antenna element corresponding to at least one antenna port that is active before and after the change; and transmitting, to a first device, a change indication indicating the at least one antenna port of which the at least one antenna element is changed.

In a third aspect of the present disclosure, there is provided a method. The method comprises: at a first device, receiving, from a second device, a change indication indicating at least one antenna port of which at least one antenna element is changed, the antenna port being active before and after the change; and performing at least one of a measurement of at least one reference signal or a reception of a physical channel in consideration of the at least one antenna port.

In a fourth aspect of the present disclosure, there is provided a method. The method comprises: at a second device, determining whether at least one antenna element of the second device is changed or not, the at least one antenna element corresponding to at least one antenna port that is active before and after the change; and transmitting, to a first device, a change indication indicating the at least one antenna port of which the at least one antenna element is changed.

In a fifth aspect of the present disclosure, there is provided a first apparatus. The first apparatus comprises means for receiving, from a second device, a change indication indicating that at least one antenna port of which at least one antenna element is changed, the antenna port being active before and after the change; and means for performing at least one of a measurement of at least one reference signal or a reception of a physical channel in consideration of the at least one antenna port.

In a sixth aspect of the present disclosure, there is provided a second apparatus. The second apparatus comprises means for determining whether at least one antenna element of the second device is changed or not, the at least one antenna element corresponding to at least one antenna port that is active before and after the change; and means for transmitting, to a first device, a change indication indicating that the at least one antenna port of which the at least one antenna element is changed.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
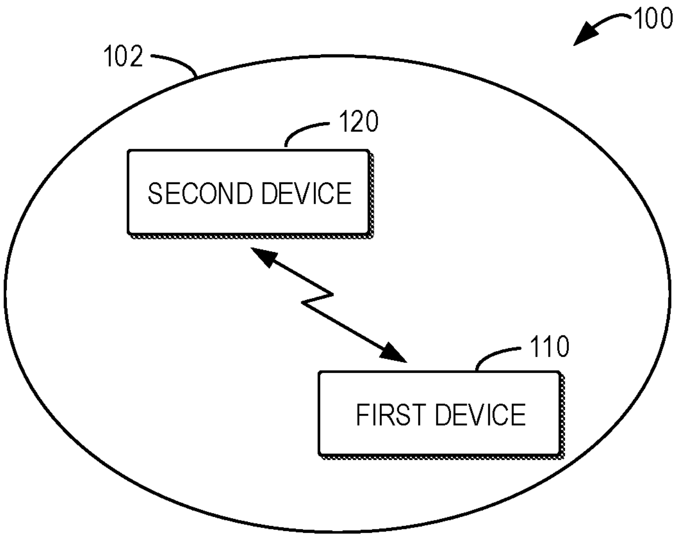
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As discussed above, network energy saving is of great importance for environmental sustainability, to reduce environmental impact (greenhouse gas emissions), and for operational cost savings. As 5G is becoming pervasive across industries and geographical areas, handling more advanced services and applications requiring very high data rates, networks are being denser, use more antennas, larger bandwidths and more frequency bands. The environmental impact of 5G needs to stay under control, and novel solutions to improve network energy savings need to be developed.

Energy consumption has become a key part for operators. According to statistics, the energy cost on mobile networks may account for ~23% of the total operator cost. Most of the energy consumption comes from the radio access network and in particular from the AAU, with data centres and fibre transport accounting for a smaller share. The power consumption of a radio access can be split into two parts: the dynamic part which is only consumed when data transmission/reception is ongoing, and the static part which is consumed all the time to maintain the necessary operation of the radio access devices, even when the data transmission/reception is not on-going.

In some mechanisms, it has been proposed to use spatial adaptation to achieve energy saving. For example, a subset of set of active antenna ports may differ or a subset of set of active or muted antenna elements for one or more antenna ports may differ. For example, during the spatial adaptation, one or more antenna elements of an antenna port of a network device may be turned off during spatial adaptation in order to save energy. However, the terminal device or UE typically use multiple occurrences/resources and temporally average corresponding measurements.

In some mechanisms, the terminal device or UE may perform an averaging measurement in order to improve the channel/interference estimation performance. However, if the UE uses measurements from resources/occurrences corresponding to same antenna port(s) but with different number/set of active TxRUs or antenna elements, the derived channel state information (CSI) (e.g., based on temporally averaging measurements performed on these resources/occurrences) may be corrupted. Therefore, CSI and beam management related procedures including measurement and report after the spatial adaptation need to be improved. In addition, signaling to enable efficient adaptation of spatial elements (e.g. antenna ports, logical antenna ports, active transceiver chains, antenna elements, etc.) need to be considered.

According to some example embodiments of the present disclosure, there is provided a solution for spatial adaptation for energy saving. In the solution, a first device receive a change indication from a second device. The change indication indicates at least one antenna port. At least one antenna element of the indicated at least one antenna port is changed. The indicated antenna port is active before and after the change. The first device performs at least one of a measurement or a reception of channel state information reference signals in consideration of the at least one antenna port.

In this way, the first device can be informed about impact(s) of spatial adaptation on antenna elements or antenna ports. Thus, the first device can adapt the impacted CSI measurement or reporting, and energy saving can be achieved.

Example embodiments of the present disclosure will be described in detail below with reference to the accompanying drawings.

FIG. 1 illustrates an example communication environment 100 in which example embodiments of the present disclosure can be implemented. In the communication environment 100, a plurality of communication devices, including a first device 110 and a second device 120, can communicate with each other. In the example of FIG. 1, the first device 110 may be a terminal device and the second device 120 may be a network device serving the terminal device. The serving area of the second device 120 may be called a cell 102.

In some example embodiments, the second device 120 may include or be coupled to one or more antenna units or antenna ports. The antenna unit or antenna port may be associated with one or more antenna elements. An antenna element may correspond to a transceiver unit (TxRU). As used herein, the term "antenna element" and "TxRU" may be used interchangeably.

In some example embodiments, the first device 110 may include or be coupled to one or more antenna units or antenna ports, where each antenna unit or antenna port may be associated with one or more antenna elements or TxRUs.

In some example embodiments, the second device 120 may configure the one or more antenna units or antenna ports. By way of example, the second device 120 may change a state of an antenna port or change a state of an antenna element associated with an antenna port during spatial adaptation to achieve energy saving.

It is to be understood that the number of devices and their connections shown in FIG. 1 are only for the purpose of illustration without suggesting any limitation. The communication environment 100 may include any suitable number of devices configured to implementing example embodiments of the present disclosure. Although not shown, it would be appreciated that one or more additional devices may be located in the cell 102, and one or more additional cells may be deployed in the communication environment 100.

In the following, for the purpose of illustration, some example embodiments are described with the first device 110 operating as a terminal device and the second device 120 operating as a network device. However, in some example embodiments, operations described in connection with a terminal device may be implemented at a network device or other device, and operations described in connection with a network device may be implemented at a terminal device or other device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
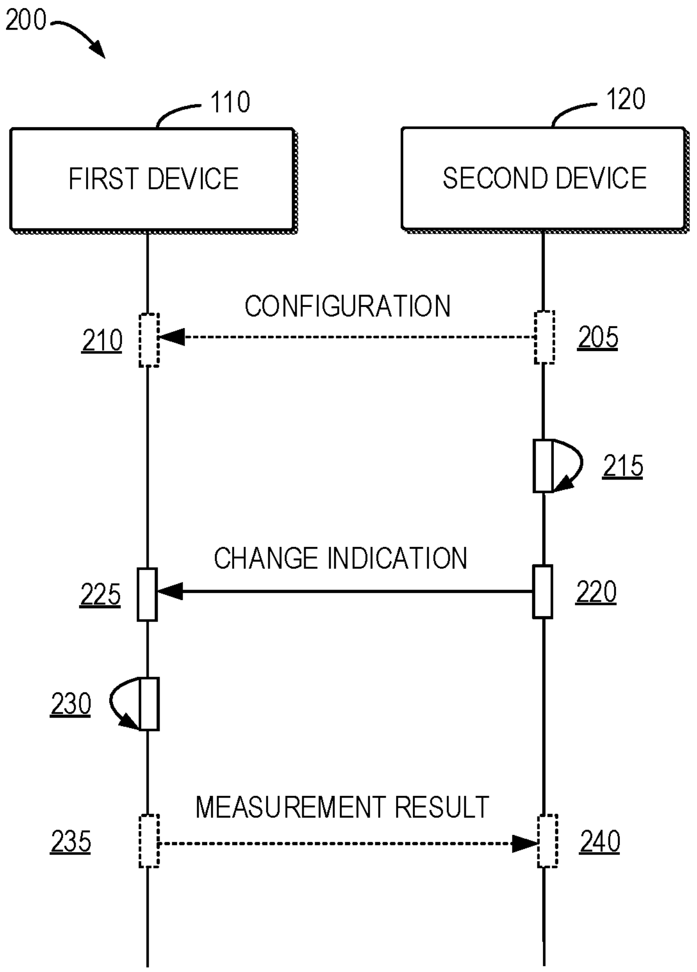
FIG. 2 illustrates a signaling chart for communication according to some example embodiments of the present disclosure.

FIG. 2 illustrates a signaling chart 200 for spatial adaptation according to some example embodiments of the present disclosure. The signaling chart 200 involves the first device 110 and the second device 120 which perform communication with each other. For the purpose of discussion, there are two devices illustrated in FIG. 2. It is to be understood that the signaling chart 200 may involves more devices or less devices, and the number of devices illustrated in FIG. 2 is only for the purpose of illustration without suggesting any limitations.

In operation, the second device 120 determines (215) that whether at least one antenna element of the second device 120 to be changed or not. The at least one antenna element corresponds to an antenna port that is active before and after the change. The second device 120 has at least one antenna port. The antenna element or TxRU may be active or turned off. As used herein, "an active antenna element or TxRU" may be referred to as "an antenna or TxRU in an active state". As used herein, "a turned off antenna element or TxRU" may also be referred to as "a muted antenna element or TxRU" or "an antenna element or TxRU in a mute state".

In some example embodiments, the second device 120 may determine to turn off one or more antenna elements associated with an antenna port due to spatial adaptation for energy savings. The antenna port may be active before and after the spatial adaption. That is, the antenna port is not muted after a new spatial pattern becomes applicable.

In some example embodiments, if at least one antenna element or TxRU of at least one antenna port is turned off from a previous active state, while remaining antenna elements or TxRUs are still active, the second device 120 may determine (215) that there is a change of the corresponding antenna port. Such change of antenna port may be due to spatial change or spatial adaptation such as turning off antenna elements to achieve energy savings. The spatial change or spatial adaptation may impact a set of antenna elements corresponding to an element port.

Alternatively, or in addition, in some example embodiments, if the spatial pattern or antenna pattern of an antenna port changes while the antenna port keeps being active, the second device 120 may determine (215) that there is a change of the corresponding antenna port.

Figure 3A:
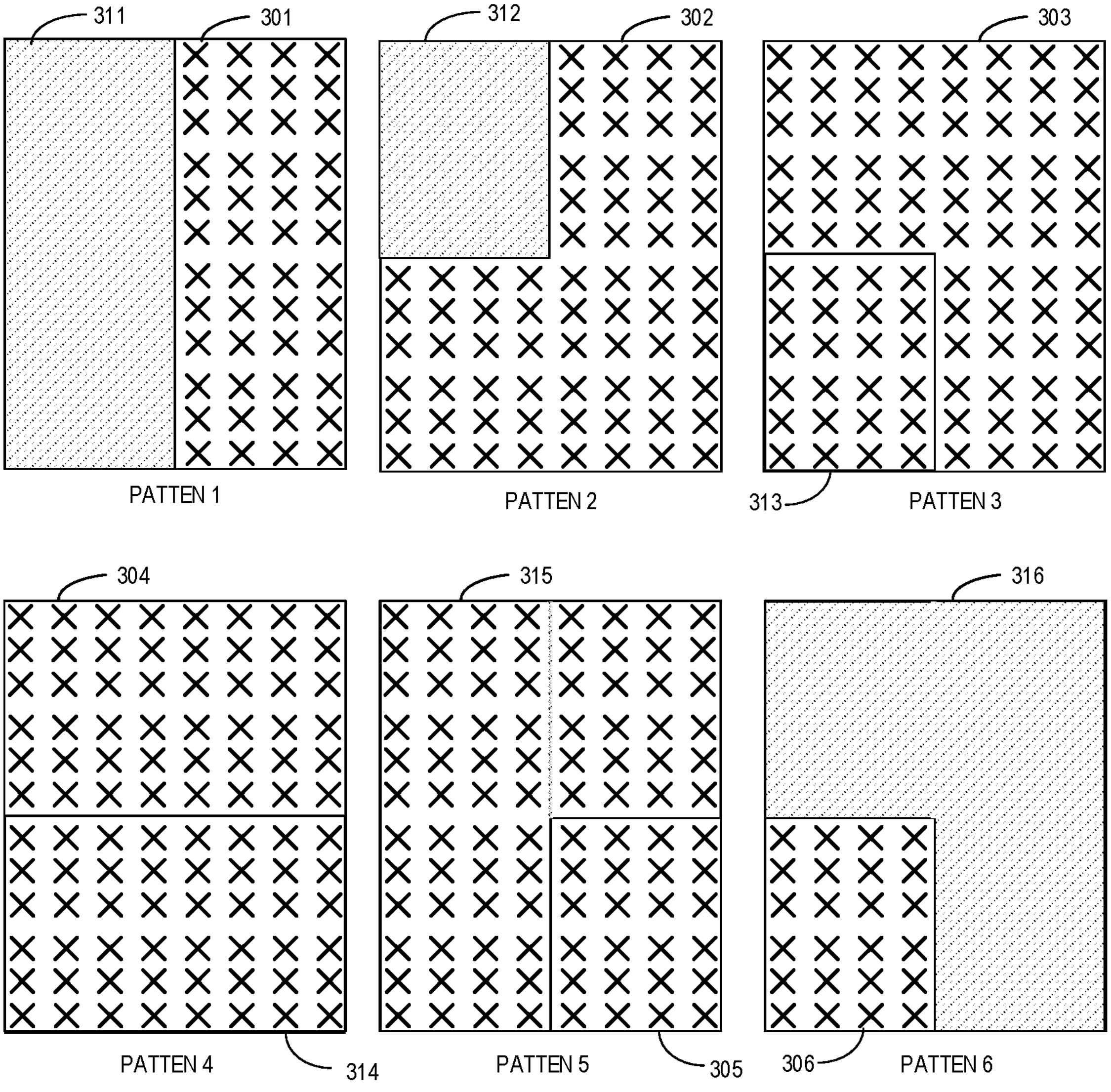
FIG. 3A illustrates an example diagram of antenna/spatial patterns.

FIG. 3A illustrates an example diagram of antenna/spatial patterns. For example, in a case where the first device 110, for example, a terminal device, is close to the second device 120, for example, a network device, or if a traffic/cell load is low, the capacity by utilizing the higher number of antennas may be not fully exploited. From the network energy saving perspective, the second device 120 may switch-off parts of the transceivers for better energy efficiency, without much of the service impact to the first device 110. In this situation, the second device 120 may have the freedom to decide on which transceivers to be muted based different deployments, where practically there can be different antenna/spatial muting patterns deployed at the network device. With different antenna elements muted, there are different antenna/spatial patterns deployed at the network device 120. The second device 120 may decide which antenna/spatial pattern is to be switched to.

There may be a plurality of antenna/spatial patterns, as shown in FIG. 3A. Specifically, FIG. 3A illustrates 6 antenna/spatial patterns. Each pattern defines which antenna element(s) are muted and/or which antenna element(s) are active. For instance, as to pattern 1, antenna elements in regions 301, 302, 303, 304, 305, and 306 are active and antenna elements in regions 311, 312, 313, 314, 315, and 316 are muted. Thus, for the 6 antenna/spatial patterns, antenna elements in regions 301 to 306 are active, and antenna elements in regions 311 to 316 are muted. Alternatively or additionally, the antennal elements in regions 311 to 316 are not muted but may be configured to have relatively low transmission power than the other antenna elements in the regions 311 to 316. In addition, the 6 patterns only represent exemplary examples, and the pattern designs may be changed.

In some example embodiments, if switching from one spatial pattern to a new/different spatial pattern and these patterns have different set/number of active TxRUs corresponding to one or more antenna ports that are common between the two patterns—including the case where the two patterns have the same antenna port subset, the second device 120 may determine (215) that there is a change of the corresponding antenna port. If an antenna port is common between the previous spatial pattern and the new spatial pattern, the number of (active) TxRUs or antenna elements corresponding to this port may or may not change between the two patterns. Such antenna port could be for Non-Zero Power (NZP) channel state information-reference signal (CSI-RS) resource(s) used for channel measurement or for interference measurement. Whether number of TxRUs of a common port has changed or not may be leveraged in measurement averaging and computation from multiple resources/occurrences.

Figure 3B:
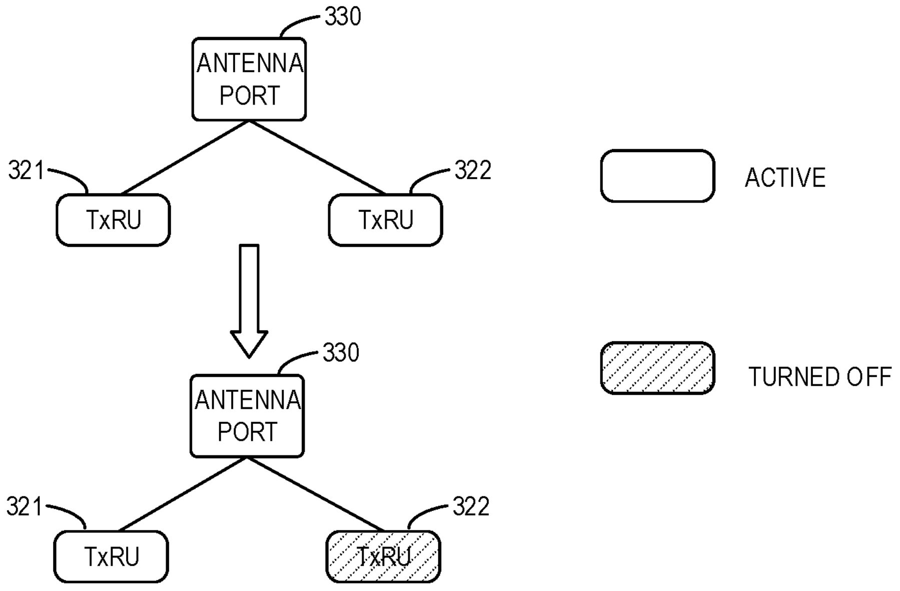
FIG. 3B illustrates an example diagram of change of antennal port.

FIG. 3B illustrates an example diagram of change of antennal port 330. The antenna port 330 is associated with a TxRU 321 and a TxRU 332. As depicted, the TxRU 322 is turned off from an initially active state after a spatial adaptation, while the TxRU 321 is still active. This enables that the antenna port is active before and after the spatial adaptation. Since the TxRU 322 is switched from being active to being off, the second device 120 determines (215) that there is a change of at least one antenna element of the second device 120.

Reference is now back to FIG. 2. The second device 120 transmits (220), to the first terminal device 110, a change indication indicating the at least one antenna port of which the at least one antenna element is changed. The first device 110 receives (225) the change indication. For example, the second device 120 may transmit (215) the change indication through a medium access control control element (MAC CE), downlink control information (DCI), or a Radio Resource Control (RRC) signaling.

By way of example, the change indication may be carried in MAC CE, DCI or RRC based on a bitmap(s) or codepoint(s) (using new or existing/reserved entries or bits or fields). At least one bit may represent one or more antenna ports and indicate whether (or not) the set/subset/number of active antenna elements/TxRUs for at least one of these ports has changed.

In some example embodiments, the change indication may indicate the at least one antenna element that has changed. Alternatively, or in addition, in some example embodiments, the change indication may indicate at least one transceiver corresponding to the at least one antenna port that has changed. The change indication may also indicate a number of the at least one antenna elements.

In some example embodiments, the change indication may indicate whether the number of at least one antenna element or a number of the at least one transceiver has changed. Alternatively, or in addition, in some example embodiments, the change indication may indicate whether the at least one antenna element or the at least one transceiver has changed. In some example embodiments, the change indication may indicate whether an energy level or a power level of the at least one antenna port has changed.

It is to be understood that the change indication may indicate any one of the above indicated information. The change indication may also indicate all the above indicated information or any other suitable information. Scope of the present disclosure is not limited in this regard.

In some example embodiments, the change indication comprises at least one bit indicating that at least one configuration related to the at least one antenna element or the at least one antenna port is subject to the change indication. That is, the change indication for one or more antenna ports may be for or per at least one configuration.

Example of the at least one configuration may comprise, but not limited to, a CSI report configuration or CSI report triggering state, a CSI-RS resource configuration, a CSI-RS or CSI configuration, a configuration of at least one resource for channel measurement, a configuration of at least one resource for interference measurement, a CSI triggering state configuration, or a PDCCH configuration. It is to be understood that the at least one configuration may comprise one or more of the above example configurations. The at least one configuration may also comprise any other suitable configuration or element, such as CSI-RS resource or resource set. In some example embodiments, the at least one configuration may be configured by the second device 120, will be discussed below.

In addition, in some example embodiments, before transmitting (220) the change indication to the first device 110, the second device 120 may transmit (205) configuration information to the first device 110. The configuration information may include an indication indicative of enablement of the change indication. For example, the second device 120 may transmit (205) the configuration information through a MAC CE, DCI, or a RRC signaling.

In some example embodiments, the configuration information may indicate at least one of: one or more antenna ports are subject to the change indication, a triggering state is subject to the change indication, a CSI report configuration is subject to the change indication, a CSI-RS resource configuration is subject to the change indication, a configuration of at least one resource for channel measurement is subject to the change indication, a configuration of at least one resource for interference measurement is subject to the change indication, a TRS measurement is subject to the change indication, a PDCCH configuration is subject to the change indication, or a DMRS configuration is subject to the change indication.

The first device 110 may receive (210) the configuration information from the second device 120. In this way, the first device 110 may be indicated/configured which antenna ports may be subject to the change indication. Alternatively, the first device 110 may be indicated/configured which elements may have their corresponding antenna ports to be subject to the change indication, such as which triggering state(s), CSI report configuration(s), CSI-RS resource or resource set configuration(s), one or more resources for channel/interference measurement, etc.

In some example embodiments, CSI-RSs are used for various purposes, including deriving measurements for mobility and beam management, as well as for interference measurements. The first device 110 may be configured with one or several CSI-RS resource-set, where each CSI-RS resource-set includes one or several configured CSI-RS resource(s) or synchronization signal and physical broadcast channel (PBCH) block (S-SSB)-block resource(s). A CSI-RS resource-set may be operated as periodic, semi-persistent, or aperiodic. A CSI-RS resource may be configured with up to 32 logical antenna ports, and the density is configurable.

In the time domain, a CSI-RS resource may start at any orthogonal frequency division multiplex (OFDM) symbol of a slot. It may span 1, 2, or 4 OFDM symbols depending on the number of ports configured. Likewise, a measurement reporting of CSI of the first device 110 may be also operated with periodic, semi-persistent, or aperiodic manner, which is so-called report types in NR report configuration. The periodic CSI-RS resources may be used to generate any report type. The semi-persistent and periodic CSI-RS resources may be used to generate semi-persistent CSI reports. The aperiodic CSI-RS may only be utilized only to generate the aperiodic report.

In some example embodiments, the configuration related to the CSI-RS transmission comprises a list of CSI-RS resource-sets, where each set include certain CSI-RS resources. For semi-persistent and aperiodic CSI-RS, the actual triggering of CSI-RS transmission is per CSI-RS resource-set via either MAC CE or DCI. A resource set may be used as part of device report configurations describing what to be measured and which measurement reporting are to be done by the device such as the terminal device 110. Specifically, if a CSI-RS resource-set is configured as 'aperiodic' by RRC, the CSI-RS resource set configuration includes a slot offset, aperiodicTriggeringOffset which defines the time interval between the triggering DCI and the CSI-RS transmission. If aperiodic CSI-RS is triggered, the second device 120 may send CSI-RS according to the slot offset defined by RRC, and the first device 110 may receive the CSI-RS within the indicated slot accordingly.

In some example embodiments, at least one bit may indicate which of the above configurations or configuration information has been previously provided by the second device 120. This at least one bit may be signaled in a separate message. Alternatively, the at least one bit may be signaled in a same message with the configuration information, or in a same message with the change information.

In some example embodiments, the second device 120 may transmit (220) the change indication via DCI to a plurality of devices including the first device 110 at the same time through group common signaling. In such cases, the DCI may be scrambled by a Radio-Network Temporary Identifier (RNTI) for the group common signaling. Each device receiving the change indication may have a dedicated change indication. Alternatively, a same change indication may be carried for all devices.

In some example embodiments, for a dedicated PDCCH for the first device 110, by scrambling DCI with a specific RNTI and/or setting some DCI fields to specific values, it may indicate the first device 110 that this DCI or PDCCH is carrying the change indication.

In some example embodiments, the change indication is in the form of a bitmap. At least one bit of the change indication represents one of the at least one antenna port. An example change indication may be bitmap [1 0 0 0] in DCI or MAC CE. Such change indication may correspond to 4 antenna ports. That is, the bitmap may represent states of 4 antenna ports. Bit value "1" may indicate that at least one antenna element of the corresponding port is changed, or the corresponding antenna port is impacted. Bit value "0" may indicate that antenna elements of the corresponding port is not changed, or the corresponding antenna port is not impacted. In this example, bitmap [1 0 0 0] indicates that the first antenna port is indicated to be impacted, or at least one antenna element of the first antenna is changed. It is to be understood that the meanings of bit value "1" and bit value "0" may be exchanged in some example embodiments.

In some example embodiments, the change indication may be in the form of a codepoint. A codepoint may comprise one or more bits. Alternatively, or in addition, in some example embodiments, the change indication may be in the form of a combination of the bitmap and the codepoint. At least one bit of the change indication represents an antenna port whose antenna element is changed.

In some example embodiments, the change indication comprises identification information indicating a serving cell of the first device 110. The identification information may comprise at least one bit. By way of example, the change indication may be per one or more serving cells. The change indication may be through a bitmap in MAC CE, wherein each bit represents at least one cell. There may be indication on which cells have signaling the change indication.

The first device 110 receives (225) the change indication from the second device 120 and perform (230) at least one of a measurement of at least one reference signal or a reception of a physical channel (such as PDSCH, PDCCH) in consideration of the at least one antenna port. In one example, the first device 110 may perform (230) a reception of a physical channel, such as a reception of data or control information.

In another example, the first device 110 may perform (230) the measurement of at least one reference signal such as CSI-RS in consideration of the at least one antenna port. The second device 120 may transmit, to the first device 110, at least one CSI-RS through the antenna port. The first device 110 may determine at least one CSI-RS corresponding to the at least one antenna port. The first device 110 may perform (230) one or more CSI measurements in consideration of the at least one antenna port.

In some example embodiments, the first device 110 may transmit (235) a result of the measurement (also referred to as a measurement result) to the second device 120. The second device 120 may receive (240) the measurement result such as a measurement result of the CSI-RS.

In this way, the first device 110 may be able to (correctly) adapt the impacted CSI measurement/reporting based on the change indication. For instance, the first device 110 may decide to restart, after receiving the change indication, CSI measurements corresponding to a CSI (report) configuration for which a change for corresponding antenna ports is indicated. Alternatively, the first device 110 may decide to omit some measurements and not use those for deriving CSI in this case. Alternatively, the first device 110 may refrain from reporting CSI in this case.

As discussed above, the CSI-RS may be periodic or semi-persistent (or aperiodic). In some example embodiments, the second device 120 may transmit at least one periodic or semi-persistent CSI-RS to the first device 110. For example, the second device 120 may transmit a periodic or semi-persistent CSI-RS with index 1 to the first device 110. The CSI-RS with index 1 corresponds to antenna ports p1 and p2. The second device 120 may transmit a periodic or semi-persistent CSI-RS with index 2 to the first device 110. The CSI-RS with index 2 corresponds to antenna ports p3 and p4. If at least one antenna element of the antenna port p4 is changed, the second device 120 may transmit (220) the change indication indicating the antenna port p4. The first device 110 receives (225) the change indication. The first device 110 may then restart CSI measurements or CSI averaging corresponding to antenna port p4 of CSI-RS with index 2 for CSI report.

In some example embodiments, the CSI-RS comprises a tracking reference signal (TRS). The performed measurements may be TRS-based measurements. The TRS-based measurements may comprise at least one of: time and frequency tracking, time and frequency estimation, doppler and delay estimation, or doppler and delay calculation. In this way, the first device may receive the change indication that a TRS related configuration is impacted by a spatial change/adaption. Thus, the first device may restart, after receiving the change indication, TRS based measurements corresponding to a TRS related configuration impacted by the spatial configuration/setting change.

In some example embodiments, CSI-RS may comprise Zero Power (ZP)-CSI-RSs which are empty resource elements (REs) used for interference measurement. These REs do not contain any transmission for the first device 110 but may contain transmissions for other devices.

Alternatively, or in addition, in some example embodiments, CSI-RS may comprise NZP-CSI-RS, which are used for procedures like channel measurement, beam management, beam measurement, connected mode mobility, or the like. The first device 110 may be configured with one or more NZP CSI-RS resource set configuration(s) as indicated by the higher layer parameters CSI-ResourceConfig, and NZP-CSI-RS-ResourceSet. Each NZP CSI-RS resource set consists of K>=1 NZP CSI-RS resource(s).

The following parameters for which the first device 110 shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration: nzp-CSI-RS-ResourceId which determines CSI-RS resource configuration identity; resourceMapping which defines the number of ports, CDM-type, and OFDM symbol and subcarrier occupancy of the CSI-RS resource within a slot th; nrofPorts in resourceMapping which defines the number of CSI-RS ports; powerControlOffset; powerControlOffsetSS; BWP-Id in CSI-ResourceConfig which defines which bandwidth part the configured CSI-RS is located in, and so on. CSI-RS resources within one set may be configured with same density and same nrofPorts, except for the NZP CSI-RS resources used for interference measurement.

In some example embodiments, the first device 110 may be configured with one or more Channel State Information-Interference Measurement (CSI-IM) resource set configuration(s) as indicated by the higher layer parameter CSI-IM-ResourceSet. Each CSI-IM resource set consists of K≥1 CSI-IM resource(s).

In some example embodiment, for deriving CSI feedback, the first device 110 is not expected that a NZP CSI-RS resource for channel measurement overlaps with CSI-IM resource for interference measurement or NZP CSI-RS resource for interference measurement.

Alternatively, or in addition, in some example embodiments, for one or more antenna ports, the change indication(s) may be used to indicate whether there has been change of power or energy for the one or more antenna ports. More generally, the change indication(s) may be used to indicate whether for one or more antenna ports (or triggering state, CSI report configuration, CSI-RS resource or resource set configuration, one or more resources for channel/interference measurement, or the like) there is a corresponding change. Such change is up to the second device 120 and doesn't need to be known at the first device 110 and not to be disclosed to the first device 110, such as set/subset of TxRUs corresponding to an antenna port. In this way, the first device 110 may be informed that, for example, a change of power or energy has happened.

Several example embodiments regarding spatial adaptation for energy saving have been described above. The present scheme provides a flexible and efficient way to inform a first device 110, for example, a terminal device (or multiple terminal devices) about impact(s) of (dynamic) spatial adaptation on some CSI related configurations, specifically antenna ports.

By doing so, the first device 110 will then be able to (correctly) adapt the impacted CSI measurement/reporting. For instance, the first device 110 may decide to restart, after receiving the indication(s), CSI measurements corresponding to a CSI (report) configuration for which a change for corresponding antenna ports is indicated.

Figure 4:
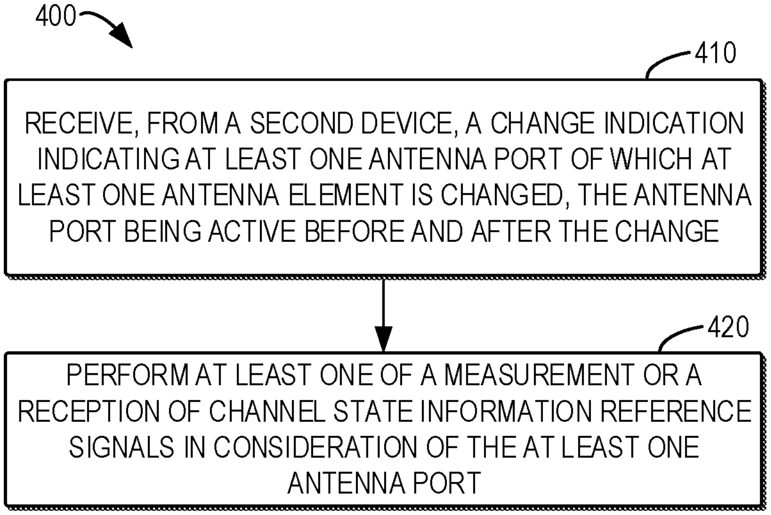
FIG. 4 illustrates a flowchart of a method implemented at a first device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device 110 in FIG. 1.

At block 410, the first device 110 receives, from a second device such as the second device 120, a change indication indicating at least one antenna port of which at least one antenna element is changed. The antenna port is active before and after the change.

At block 420, the first device 110 performs at least one of a measurement of at least one reference signal or a reception of a physical channel in consideration of the at least one antenna port.

In some example embodiments, the change indication is transmitted through at least one of a MAC CE, DCI, or a RRC, signaling.

In some example embodiments, the DCI is scrambled by a RNTI for a group common signaling.

In some example embodiments, the change indication indicates at least one of: the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, or whether an energy level or a power level of the at least one antenna port has changed.

In some example embodiments, the change indication is in the form of a bitmap, a codepoint, or a combination of the bitmap and the codepoint, and at least one bit of the change indication represents one of the at least one antenna port.

In some example embodiments, the change indication comprises information indicating that at least one configuration related to the at least one antenna element or the at least one antenna port.

In some example embodiments, the at least one configuration comprises at least one the following: a channel state information, CSI, report configuration, a CSI-reference signal, RS, resource configuration, a CSI-RS or CSI configuration, a configuration of at least one resource for channel measurement, a configuration of at least one resource for interference measurement, a CSI triggering state configuration, or a physical downlink channel configuration.

In some example embodiments, the change indication comprises identification information indicating a serving cell of the first device 110.

In some example embodiments, the first device 110 may receive, from the second device 120, configuration information. The configuration information includes an indication indicative of enablement of the change indication.

In some example embodiments, the configuration information indicates at least one of: one or more antenna ports are subject to the change indication, at least one triggering state is subject to the change indication, at least one CSI report configuration is subject to the change indication, at least one CSI-RS resource configuration is subject to the change indication, at least one configuration of at least one resource for channel measurement is subject to the change indication, at least one configuration of at least one resource for interference measurement is subject to the change indication, at least one TRS measurement is subject to the change indication, at least one physical downlink channel configuration is subject to the change indication, or at least one DMRS configuration is subject to the change indication.

In some example embodiments, the first device 110 may determine at least one CSI-RS corresponding to the at least one antenna port. The first device 110 may perform one or more CSI measurements in consideration of the at least one antenna port.

In some example embodiments, the CSI-RS comprises a tracking reference signal, TRS, and the performed measurements are TRS-based measurements. The TRS-based measurements comprise at least one of: time and frequency tracking, time and frequency estimation, doppler and delay estimation, or doppler and delay calculation.

In some example embodiments, the first device 110 may transmit a result of the measurement to the second device.

Figure 5:
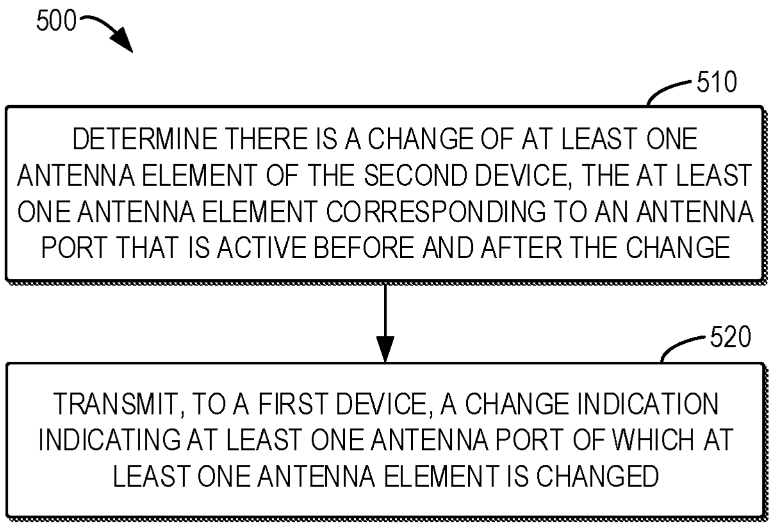
FIG. 5 illustrates a flowchart of a method implemented at a second device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 in FIG. 1.

At block 510, the second device 120 determines whether at least one antenna element of the second device 120 is changed or not. The at least one antenna element corresponds to at least one antenna port that is active before and after the change.

At block 520, the second device 120 transmits, to a first device such as the first device 110, a change indication indicating the at least one antenna port of which the at least one antenna element is changed.

In some example embodiments, the change indication is transmitted through at least one of a MAC CE, DCI, or a RRC signaling.

In some example embodiments, the DCI is scrambled by a RNTI for a group common signaling.

In some example embodiments, the change indication indicates at least one of: the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, or whether an energy level or a power level of the at least one antenna port has changed.

In some example embodiments, the change indication is in the form of a bitmap, a codepoint, or a combination of the bitmap and the codepoint, and at least one bit of the change indication represents one of the at least one antenna port.

In some example embodiments, the change indication comprises at least one bit indicating that at least one configuration related to the at least one antenna element or the at least one antenna port is subject to the change indication.

In some example embodiments, the at least one configuration comprises at least one the following: a CSI report configuration, a CSI-RS resource configuration, a CSI-RS or CSI configuration, a configuration of at least one resource for channel measurement, a configuration of at least one resource for interference measurement, a CSI triggering state configuration, or a physical downlink channel configuration.

In some example embodiments, the change indication comprises identification information indicating a serving cell of the first device 110.

In some example embodiments, the second device 120 may transmit, to the first device 110, configuration information. The configuration information includes an indication indicative of enablement of the change indication.

In some example embodiments, the configuration information indicates at least one of: one or more antenna ports are subject to the change indication, a triggering state is subject to the change indication, a CSI report configuration is subject to the change indication, a CSI-reference signal, RS, resource configuration is subject to the change indication, a configuration of at least one resource for channel measurement is subject to the change indication, a configuration of at least one resource for interference measurement is subject to the change indication, a tracking reference signal, TRS, measurement is subject to the change indication, a physical downlink channel configuration is subject to the change indication, or a demodulation reference signal, DMRS, configuration is subject to the change indication.

In some example embodiments, the second device 120 may transmit, to the first device 110, at least one CSI-RS through the at least one antenna port.

In some example embodiments, the at least one CSI-RS comprises at least one tracking reference signal, TRS.

In some example embodiments, the second device 120 may receive, from the first device 110, a result of a measurement of the at least one CSI-RS.

In some example embodiments, a first apparatus capable of performing any of the method 400 (for example, the first device 110 in FIG. 1) may comprise means for performing the respective operations of the method 400. The means may be implemented in any suitable form. For example, the means may be implemented in a circuitry or software module. The first apparatus may be implemented as or included in the first device 110 in FIG. 1.

In some example embodiments, the first apparatus comprises means for receiving, from a second device, a change indication indicating that at least one antenna port of which at least one antenna element is changed, the antenna port being active before and after the change; and means for performing at least one of a measurement of at least one reference signal or a reception of a physical channel in consideration of the at least one antenna port.

In some example embodiments, the change indication is transmitted through at least one of MAC CE, DCI, or a RRC signaling.

In some example embodiments, the DCI is scrambled by a RNTI for a group common signaling.

In some example embodiments, the change indication indicates at least one of: the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, or whether an energy level or a power level of the at least one antenna port has changed.

In some example embodiments, the change indication is in the form of a bitmap, a codepoint, or a combination of the bitmap and the codepoint, and at least one bit of the change indication represents one of the at least one antenna port.

In some example embodiments, the change indication comprises information indicating that at least one configuration related to the at least one antenna element or the at least one antenna port.

In some example embodiments, the at least one configuration comprises at least one the following: a channel state information, CSI, report configuration, a CSI-reference signal, RS, resource configuration, a CSI-RS or CSI configuration, a configuration of at least one resource for channel measurement, a configuration of at least one resource for interference measurement, a CSI triggering state configuration, or a physical downlink channel configuration.

In some example embodiments, the change indication comprises identification information indicating a serving cell of the first apparatus.

In some example embodiments, the first apparatus further comprises: means for receiving, from the second device, configuration information. The configuration information includes an indication indicative of enablement of the change indication.

In some example embodiments, the configuration information indicates at least one of: one or more antenna ports are subject to the change indication, a triggering state is subject to the change indication, a CSI report configuration is subject to the change indication, a CSI-reference signal, RS, resource configuration is subject to the change indication, a configuration of at least one resource for channel measurement is subject to the change indication, a configuration of at least one resource for interference measurement is subject to the change indication, a tracking reference signal, TRS, measurement is subject to the change indication, a physical downlink channel configuration is subject to the change indication, or a demodulation reference signal, DMRS, configuration is subject to the change indication.

In some example embodiments, means for performing the measurement comprises: means for determining at least one CSI-RS corresponding to the at least one antenna port; and means for performing one or more CSI measurements in consideration of the at least one antenna port.

In some example embodiments, the CSI-RS comprises a tracking reference signal, TRS, and the performed measurements are TRS-based measurements, the TRS-based measurements comprise at least one of: time and frequency tracking, time and frequency estimation, doppler and delay estimation, or doppler and delay calculation.

In some example embodiments, the first apparatus further comprises means for transmitting a result of the measurement to the second device.

In some example embodiments, the first apparatus further comprises means for performing other operations in some example embodiments of the method 400 or the first device 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises means for determining whether at least one antenna element of the second device is changed or not, the at least one antenna element corresponding to at least one antenna port that is active before and after the change; and means for transmitting, to a first device, a change indication indicating the at least one antenna port of which the at least one antenna element is changed.

In some example embodiments, the change indication is transmitted through at least one of MAC CE, DCI, or a RRC signaling.

In some example embodiments, the DCI is scrambled by a RNTI for a group common signaling.

In some example embodiments, the change indication indicates at least one of: the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, or whether an energy level or a power level of the at least one antenna port has changed.

In some example embodiments, the change indication is in the form of a bitmap, a codepoint, or a combination of the bitmap and the codepoint, and at least one bit of the change indication represents one of the at least one antenna port.

In some example embodiments, the change indication comprises at least one bit indicating that at least one configuration related to the at least one antenna element or the at least one antenna port is subject to the change indication.

In some example embodiments, the at least one configuration comprises at least one the following: a channel state information, CSI, report configuration, a CSI-reference signal, RS, resource configuration, a CSI-RS or CSI configuration, a configuration of at least one resource for channel measurement, a configuration of at least one resource for interference measurement, a CSI triggering state configuration, or a physical downlink channel configuration.

In some example embodiments, the change indication comprises identification information indicating a serving cell of the first device.

In some example embodiments, the second apparatus further comprises means for transmitting, to the first device, configuration information, wherein the configuration information includes an indication indicative of enablement of the change indication.

In some example embodiments, the configuration information indicates at least one of: one or more antenna ports are subject to the change indication, a triggering state is subject to the change indication, a CSI report configuration is subject to the change indication, a CSI-reference signal, RS, resource configuration is subject to the change indication, a configuration of at least one resource for channel measurement is subject to the change indication, a configuration of at least one resource for interference measurement is subject to the change indication, a tracking reference signal, TRS, measurement is subject to the change indication, a physical downlink channel configuration is subject to the change indication, or a demodulation reference signal, DMRS, configuration is subject to the change indication.

In some example embodiments, the second apparatus further comprises means for transmitting, to the first device, at least one CSI-RS through the at least one antenna port.

In some example embodiments, the at least one CSI-RS comprises at least one tracking reference signal, TRS.

In some example embodiments, the second apparatus further comprises means for receiving, from the first device, a result of a measurement of the at least one CSI-RS.

In some example embodiments, the second apparatus further comprises means for performing other operations in some example embodiments of the method 500 or the second device 120. In some example embodiments, the means comprises at least one processor; and at least one memory storing instructions that, when executed by the at least one processor, cause the performance of the second apparatus.

Figure 6:
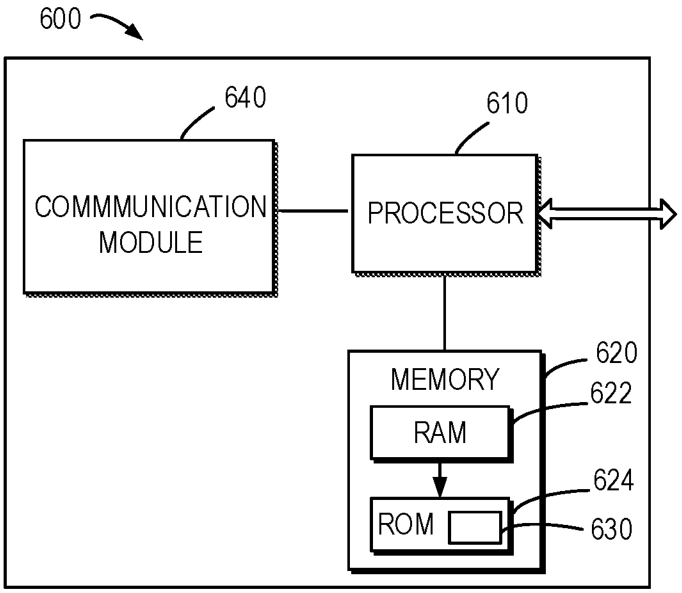
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
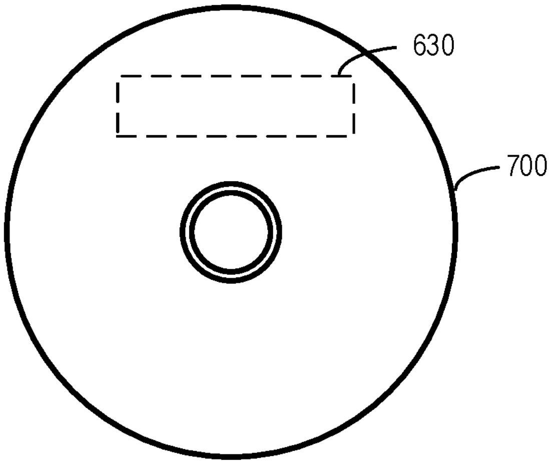
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory storing instructions that, when executed by the at least one processor, cause the first device at least to perform:

receiving, from a second device, a change indication indicating at least one antenna port of which at least one antenna element is changed, the antenna port being active before and after the change; and performing a reception of a physical channel in consideration of the at least one antenna port, wherein the change indication comprises information indicating that at least one configuration related to the at least one antenna element or the at least one antenna port is subject to the change indication, and wherein the change indication indicates:

the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, and whether an energy level or a power level of the at least one antenna port has changed, and wherein the at least one configuration comprises the following:

a configuration of at least one resource for channel measurement, a configuration of at least one resource for interference measurement, a channel state information, CSI, triggering state configuration, and a physical downlink channel configuration.

2. The first device of claim 1, wherein the change indication is transmitted through at least one of a medium access control control element, MAC CE, downlink control information, DCI, or a Radio Resource Control, RRC, signaling.

3. The first device of claim 2, wherein the DCI is scrambled by a Radio-Network Temporary Identifier, RNTI, for a group common signaling.

4. The first device of claim 1, wherein the change indication is in the form of a bitmap, a codepoint, or a combination of the bitmap and the codepoint, and at least one bit of the change indication represents one of the at least one antenna port.

5. The first device of claim 1, wherein the change indication comprises identification information indicating a serving cell of the first device, and wherein the change indication is per one or more serving cells through a bitmap in which each bit represents at least one cell.

6. The first device of claim 1, wherein the instructions further cause the first device to receive, from the second device, configuration information including an indication indicative of enablement of the change indication, and wherein the configuration information indicates that all of the following are subject to the change indication: one or more antenna ports, a triggering state, a CSI report configuration, a CSI-RS resource configuration, a configuration of at least one resource for channel measurement, a configuration of at least one resource for interference measurement, a tracking reference signal, TRS, measurement, a physical downlink control channel, PDCCH, configuration, and a demodulation reference signal, DMRS, configuration.

7. The first device of claim 1, wherein the at least one reference signal comprises a tracking reference signal, TRS, and the measurement comprises TRS-based measurements comprising all of: time and frequency tracking, time and frequency estimation, doppler and delay estimation, and doppler and delay calculation.

8. The first device of claim 1, wherein, for deriving CSI feedback in consideration of the at least one antenna port, a non-zero power, NZP, CSI-RS resource for channel measurement does not overlap with a CSI-interference measurement, CSI-IM, resource for interference measurement or a NZP CSI-RS resource for interference measurement.

9. The first device of claim 1, wherein the change indication indicates that a change has occurred for the at least one antenna port without disclosing to the first device a set or subset of transceivers corresponding to the at least one antenna port.

10. A method comprising:

receiving, at a first device from a second device, a change indication indicating at least one antenna port of which at least one antenna element is changed, the antenna port being active before and after the change; and performing reception of a physical channel in consideration of the at least one antenna port, wherein the change indication comprises information indicating that at least one configuration related to the at least one antenna element or the at least one antenna port is subject to the change indication, and wherein the change indication indicates:

the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, and whether an energy level or a power level of the at least one antenna port has changed, and wherein the at least one configuration comprises the following:

a configuration of at least one resource for channel measurement, a configuration of at least one resource for interference measurement, a channel state information, CSI, triggering state configuration, and a physical downlink channel configuration.

11. The method of claim 10, wherein the change indication is transmitted through at least one of a medium access control control element, MAC CE, downlink control information, DCI, or a Radio Resource Control, RRC, signaling.

12. The method of claim 11, wherein the DCI is scrambled by a Radio-Network Temporary Identifier, RNTI, for a group common signaling.

13. The method of claim 10, wherein the change indication is in the form of a bitmap, a codepoint, or a combination of the bitmap and the codepoint, and at least one bit of the change indication represents one of the at least one antenna port.

14. A non-transitory storage medium comprising instructions stored thereon for causing an apparatus at least to perform;

receiving, from a second device, a change indication indicating at least one antenna port of which at least one antenna element is changed, the antenna port being active before and after the change; and performing a reception of a physical channel in consideration of the at least one antenna port, wherein the change indication comprises information indicating that at least one configuration related to the at least one antenna element or the at least one antenna port is subject to the change indication, and wherein the change indication indicates:

the at least one antenna element that has changed, a number of the at least one antenna elements, at least one transceiver corresponding to the at least one antenna port that has changed, whether the number of at least one antenna element or a number of the at least one transceiver has changed, whether the at least one antenna element or the at least one transceiver has changed, and whether an energy level or a power level of the at least one antenna port has changed, and wherein the at least one configuration comprises the following:

a configuration of at least one resource for channel measurement, a configuration of at least one resource for interference measurement, a channel state information, CSI, triggering state configuration, and a physical downlink channel configuration.

15. The non-transitory storage medium of claim 14, wherein the change indication is transmitted through at least one of a medium access control control element, MAC CE, downlink control information, DCI, or a Radio Resource Control, RRC, signaling.

16. The non-transitory storage medium of claim 15, wherein the DCI is scrambled by a Radio-Network Temporary Identifier, RNTI, for a group common signaling.

17. The non-transitory storage medium of claim 14, wherein the change indication is in the form of a bitmap, a codepoint, or a combination of the bitmap and the codepoint, and at least one bit of the change indication represents one of the at least one antenna port.

18. The non-transitory storage medium of claim 17, wherein the change indication comprises information indicating that at least one configuration related to the at least one antenna element or the at least one antenna port.

* * * * *